Figure 1:
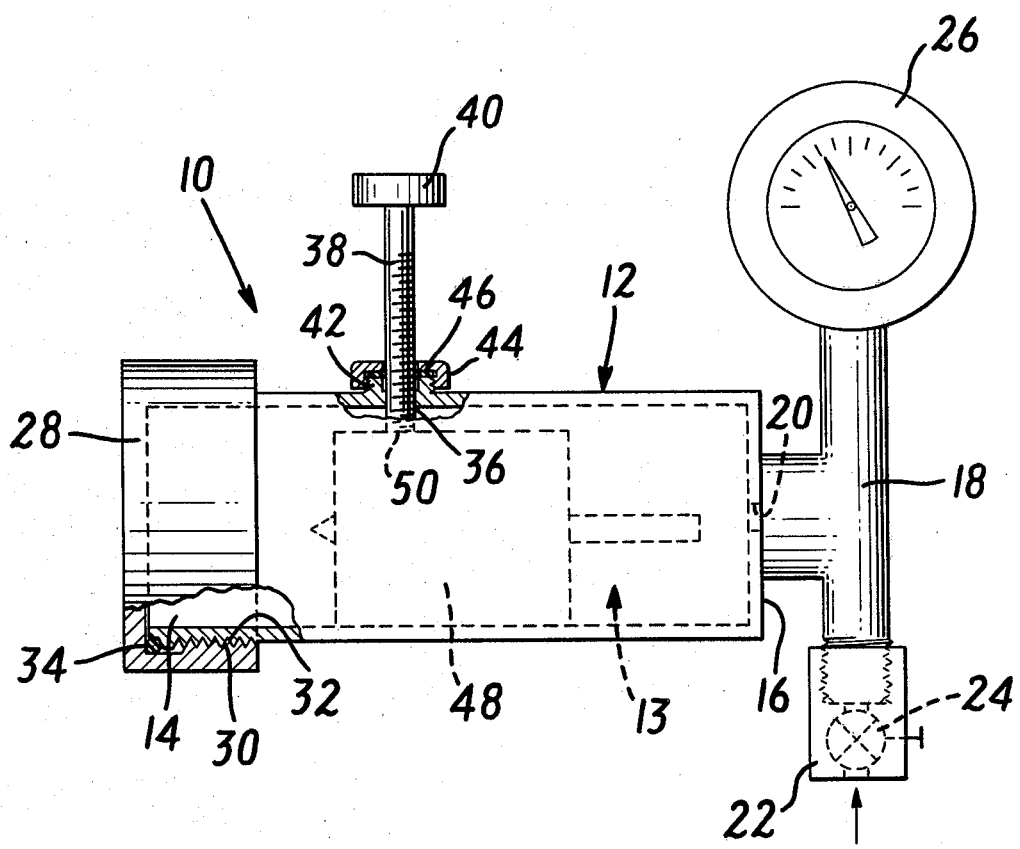

United States Patent [19]

Brown et al.

[11] 4,337,645
[45] Jul. 6, 1982

[54] LAMP PRESSURE CHECKING DEVICE

[75] Inventors: Robert S. Brown; Russell C. Schwickert, both of Lake Hiawatha; Nickolas Demas, Cranford, all of N.J.

[73] Assignee: McGraw-Edison Company, Rolling Meadows, Ill.

[21] Appl. No.: 216,074

[22] Filed: Dec. 15, 1980

[51] Int. Cl.³ .............................................. G01M 3/02
[52] U.S. Cl. ......................................... 73/52; 73/49.3
[58] Field of Search .................. 73/52, 37, 45.4, 49.3, 73/700, 714

[56] References Cited

U.S. PATENT DOCUMENTS

| 983,962 | 2/1911 | Werner | 73/52 |
|---|---|---|---|
| 1,211,942 | 1/1917 | Hoff | 73/52 |
| 2,393,996 | 2/1946 | Layton | 73/37 |
| 3,407,123 | 10/1968 | Peterson | 73/49.3 |
| 3,888,111 | 6/1975 | Craig | 73/49.3 |

Primary Examiner—Donald O. Woodiel
Attorney, Agent, or Firm—Ronald J. LaPorte; Jon C. Gealow

[57] ABSTRACT

The invention relates to a method and apparatus for checking the internal pressure of a filled lamp bulb. According to the invention, a filled bulb to be checked is inserted into a gas tight chamber; the chamber is then sealed and pressurized. The lamp envelope is broken by means in the chamber. Chamber pressure is measured before and after breaking the envelope.

12 Claims, 1 Drawing Figure

LAMP PRESSURE CHECKING DEVICE

BACKGROUND OF THE INVENTION

Many type of electrical lamps require a gas fill at a precise pressure for optimum operation. Heretofore it has been the practice to check the internal lamp pressure by breaking the lamp bulb under water. The volume of water drawn into the bulb is measured when the pressure in the lamp is less than atmospheric pressure, or the escaping gas is funneled into a liquid-filled inverted graduated cylinder if the bulb were filled to a pressure above the atmospheric pressure. In this latter case, the gas will displace the water in the cylinder and can thus be measured.

SUMMARY OF THE INVENTION

According to the invention, the filled bulb to be checked is inserted into a chamber in the pressure checking device. The chamber is then provided with a fluid seal and filled with fluid, preferably with air or gas, to a predetermined pressure and preferably to the pressure set for filling the bulb during manufacture. The glass bulb or envelope is then broken. When the bulb contains less pressure than the predetermined pressure initially filling the chamber, a pressure gauge measuring the pressure in the chamber will indicate a lesser pressure as a result of the gas in the chamber occupying the space of the interior of the bulb. If the lamp pressure is above the initial chamber pressure, the increased pressure in the lamp bulb which is released upon the breaking of the bulb will remain in the cavity and cause the gauge to register a higher reading. Of course, if the pressure in the bulb and the cavity are the same, the gauge reading will not change.

It will be obvious to those of skill in the art that in accordance with the principle of the present invention, the predetermined pressure in chamber 13 need not be greater than atmospheric pressure and that the chamber may be filled with liquid if that should prove desirable.

These and other aspects of the invention may be more easily understood by reference to the drawing in which FIG. 1 is a schematic illustration of the pressure-checking device according to the invention.

In FIG. 1, the pressure-checking device is illustrated generally at 10. A housing 12, preferably a hollow cylinder, has a chamber 13 formed as a cylindrical cavity therein.

The chamber 13 is open at one end 14 and is sufficiently large to enclose the envelope of any of the bulbs desired to be checked. A conventional Tee-fitting 18 is removably attached to the closed end 16 of the cylinder by conventional means such as mating threaded fittings (not shown). It will be appreciated that the Tee-fitting 18 may also be permanently affixed to the housing.

An orifice 20 in the closed end 16 of the cylinder communicates pressure from the Tee-fitting 18 to the chamber 13.

At one end of the Tee-fitting 18 is a fluid inlet 22 for connection to a regulated source of pressurized fluid, preferably compressed air (not shown). The inlet 22, which is conveniently a conventional threaded fitting, has a valve 24 for feeding regulated pressure from the source to the chamber 13 and for isolating the source from the chamber of the housing 12. A pressure gauge 26 or other conventional pressure indicator is conveniently attached to the opposite end of the Tee-fitting 18 to measure the pressure of the cavity. It will be appreciated that the pressure gauge 26 can be located at any point on the housing 12 as well so long as it is in communication with the chamber 13.

A removable cap 28 covers the open end of the housing 12. Preferably, the cap is internally threaded at threaded portion 30 to mate with corresponding threaded portion 32 on the external walls of the end portion 14 of the housing 12. An O-ring 34 is preferably used between the cap 28 and housing 12 to provide a gastight seal. It will be appreciated that other known means for providing a gastight seal between the cap 28 and the housing 12 may be readily chosen by a person skilled in the art.

One convenient means for breaking a lamp bulb inside chamber 13 is provided by a threaded hole 36 in the wall of housing 12 which receives a threaded rod 38 having a knob 40 at the exterior end thereof. Rotation of the knob 40 in one direction screws the rod 38 further into the chamber 13. Rotation of the knob 40 in the opposite direction will cause the rod to move in the opposite direction.

The threaded portion of the rod received in the threaded hole 36 must also be provided with a gastight seal. Any other convenient means may be employed for breaking the lamp envelope such a pointed rod slidably mounted in a gastight seal in the wall of chamber 13.

Preferably, a shoulder 42 extends externally from the wall surrounding hole 36. The shoulder 42 has external threads on the periphery thereof for receiving a threaded cap 44 having a hole therein of diameter corresponding to that of the rod 38 for a close fit therewith. Gasket 46, suitably neoprene, having a hole therein of diameter enabling a snug fit against the rod 38, is compressed by cap 44 against shoulder 42 and rod 38 when cap 44 is threadedly received onto shoulder 42 to create a gastight seal between the rod 38 and the chamber 13.

In FIG. 1, a representative lamp bulb 48 is shown resting in the chamber 13 of housing 12. The rod 38 is shown in abutment against the envelope 50 of the lamp bulb.

By rotating the knob 40 on the external end of rod 38 in the proper direction, an operator can screw the internal end of rod 38 further into the chamber 13. Accordingly, it is forced against the envelope 50 and when the force of the end of rod 38 against the envelope 50 of the bulb 48 is sufficient, the bulb is broken open.

The procedure for operation of the checking device is described below. A lamp bulb, for example, lamp bulb 48 is placed in the chamber 13 through the open end 14 after cap 28 is removed. Cap 28 is then screwed into place to tightly seal the end of chamber 13.

Valve 24 is then opened to feed pressurized fluid, preferably compressed air from a regulated source, into chamber 13 to provide a predetermined pressure in the chamber 13. Valve 24 is then closed to isolate the source from the chamber 13. The predetermined pressure is read directly on pressure gauge 26. Preferably this predetermined pressure is the internal fill pressure established during the manufacture of the lamp bulb 48, though it is evident that any desired predetermined pressure may be chosen.

The knob 40 is then rotated so that rod 38 breaks the envelope 50 of lamp bulb 48.

If during the manufacture, the bulb 48 has been pressurized to less than the pressure pre-set in the chamber 13, the pressure in chamber 13 after the bulb 48 is broken will be lowered by an amount proportional to the bulb's actual internal pressure measured in mms. of mercury or PSI. Thus the pressure gauge 26 will show a lower reading after the bulb 48 is broken than its initial reading. Conversely, if the internal bulb pressure is greater than the pre-set pressure, the additional pressure released from the bulb 48 will cause the pressure gauge 26 to indicate a higher pressure reading proportional to the increased pressure of the bulb 48 above the pre-set pressure. It is evident that when the pressure in the bulb 48 is equal to the pre-set pressure, the reading on the gauge will not change after bulb 48 is broken.

The gauge readings are mathematically proportional to the absolute pressure of the actual fill and may be checked against the readings used for actually filling the lamp. Thus a simple and novel quality-control pressure checking device is provided by the invention disclosed herein.

It will be understood that the claims are intended to cover all changes and modifications of the preferred embodiments of the invention herein chosen for the purpose of illustration which do not constitute departures from the spirit and scope of the invention.

What is claimed is:

1. A lamp-pressure checking device comprising:
   (a) a housing;
   (b) said housing having a chamber therein;
   (c) means for allowing insertion of a lamp bulb into said chamber;
   (d) means for sealing said chamber, said means for sealing providing a gastight seal;
   (e) means for pressurizing said chamber to a predetermined pressure;
   (f) means for measuring the pressure in said chamber; and
   (g) means in said chamber for breaking a lamp bulb inserted therein.

2. The device of claim 1 wherein said housing is cylindrical and said chamber is a cylindrical cavity therein.

3. The device of claim 2 wherein the means for allowing insertion of a bulb is an opening at the end of said cylindrical cavity.

4. The device of claim 3 wherein said means for sealing comprises a cap on the end of said housing.

5. The device of claim 1 wherein the means for breaking is a rod threadedly received in a wall of the housing, said rod being adapted for rotation in said wall so that rotation in one direction will increase the length of the portion of said rod in said cavity.

6. The device of claim 1 wherein said means for measuring pressure is a pressure gauge in association with said means for pressurizing said chamber.

7. A pressure checking device for checking the fill pressure of filled bulbs comprising:
   (a) a cylindrical housing having a cylindrical cavity therein, said cavity having an opening at one end thereof adapted for insertion of a filled bulb;
   (b) a cap, said cap being adapted for hermetically sealing said opening at the end of said cavity;
   (c) said housing having a hole in the wall thereof;
   (d) a rod;
   (e) said rod being received through said hole for travel in and out of said cavity;
   (f) means for sealing said rod in said hole in a gastight manner;
   (g) a fitting attached to said housing, said fitting being adapted for connection to a pressure source for pressurizing said cavity; and
   (h) a pressure gauge on said fitting for measuring pressure in said chamber.

8. Apparatus for checking the pressure inside a lamp bulb which comprises:
   (a) a test chamber having an opening for inserting a lamp bulb therein;
   (b) means for sealing said opening;
   (c) means for supplying fluid to the inside of said chamber;
   (d) means for breaking a lamp bulb when positioned inside said chamber;
   (e) means for determining change in fluid pressure in said chamber when a lamp bulb is broken therein.

9. Apparatus specified in claim 8 in which the means for supplying fluid is adapted to supply the fluid as a gas under greater than atmospheric pressure.

10. The method of testing the internal pressure of a lamp bulb in a test chamber which comprises the steps of:
    (a) placing a lamp bulb inside said test chamber;
    (b) supplying fluid inside said chamber exterior to said lamp bulb;
    (c) breaking the lamp bulb inside said test chamber; and
    (d) measuring the change in the fluid occasioned by breaking said lamp bulb.

11. The method specified in claim 10 in which the fluid is supplied as a gas under greater than atmospheric pressure.

12. A method of checking the pressure of a filled lamp bulb comprising the steps of:
    (a) placing a bulb to be tested into a chamber;
    (b) sealing said chamber to provide a gastight seal;
    (c) filling said chamber to a predetermined pressure;
    (d) breaking the lamp bulb envelope; and
    (e) measuring the pressure in said chamber.

* * * * *